US009798129B2

(12) United States Patent
Furuhata

(10) Patent No.: US 9,798,129 B2
(45) Date of Patent: Oct. 24, 2017

(54) MICROSCOPE SYSTEM AND METHOD FOR DECIDING STITCHED AREA

(71) Applicant: OLYMPUS CORPORATION, Shibuya-ku, Tokyo (JP)

(72) Inventor: Tsuyoshi Furuhata, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 655 days.

(21) Appl. No.: 14/263,967

(22) Filed: Apr. 28, 2014

(65) Prior Publication Data
US 2014/0340426 A1 Nov. 20, 2014

(30) Foreign Application Priority Data

May 14, 2013 (JP) .................. 2013-102275

(51) Int. Cl.
G02B 21/36 (2006.01)
G06T 3/40 (2006.01)
G06T 11/60 (2006.01)
G02B 21/00 (2006.01)
G06T 5/50 (2006.01)

(52) U.S. Cl.
CPC .......... G02B 21/367 (2013.01); G06T 3/4038 (2013.01); G06T 11/60 (2013.01); G02B 21/0024 (2013.01); G06T 5/50 (2013.01); G06T 2207/10056 (2013.01); G06T 2207/20221 (2013.01)

(58) Field of Classification Search
None
See application file for complete search history.

(56) References Cited

U.S. PATENT DOCUMENTS 7,016,109 B2 3/2006 Nakagawa
7,248,403 B2 7/2007 Nakagawa
(Continued)

FOREIGN PATENT DOCUMENTS

JP 2004-101871 A 4/2004
JP 2010-112969 A 5/2010

OTHER PUBLICATIONS

Extended European Search Report (EESR) dated Oct. 8, 2014 issued in counterpart European Application No. 14166348.4.
(Continued)

Primary Examiner — Jwalant Amin
(74) Attorney, Agent, or Firm — Holtz, Holtz & Volek PC

(57) ABSTRACT

A microscope system for stitching element images to generate a stitched image includes an element image obtaining unit configured to obtain the element image; a user image obtaining unit configured to capture a plurality of user-specified areas being an area of a sample specified by a user to obtain a plurality of user images; a rectangle area deciding unit configured to decide a rectangle area including the plurality of user-specified areas; a candidate area deciding unit configured to decide, as a candidate area, each of a plurality of areas having a size of a field of view of the element image obtaining unit arranged in a grid-like manner in the rectangle area so as to fill the rectangle area; and an element area selecting unit configured to select an element area to obtain the element image, from the plurality of candidate areas.

17 Claims, 14 Drawing Sheets

(56) References Cited

U.S. PATENT DOCUMENTS

| | | | |
|---|---|---|---|
| 2004/0238731 A1* | 12/2004 | Nishiyama | G02B 21/0024 250/234 |
| 2006/0045388 A1* | 3/2006 | Zeineh | G02B 21/365 382/312 |
| 2010/0194873 A1 | 8/2010 | Viereck et al. | |
| 2011/0064296 A1 | 3/2011 | Dixon | |
| 2014/0140595 A1* | 5/2014 | Fomitchov | G06T 7/0012 382/128 |
| 2014/0160264 A1* | 6/2014 | Taylor | G02B 21/008 348/79 |
| 2014/0340475 A1* | 11/2014 | Furuhata | H04N 5/23238 348/39 |

OTHER PUBLICATIONS

Japanese Office Action (and English translation thereof) dated Oct. 25, 2016 issued in counterpart Japanese application No. 2013-102275.

* cited by examiner

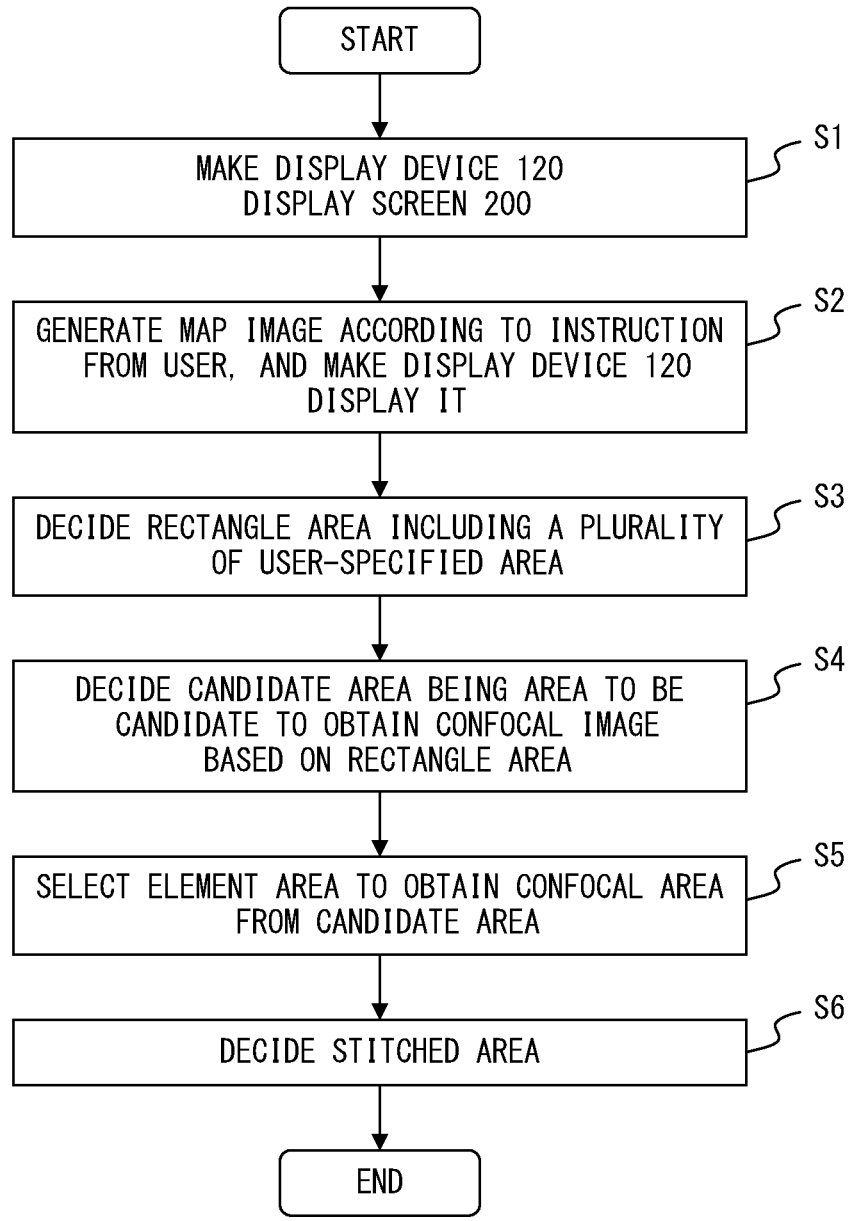
F I G. 3

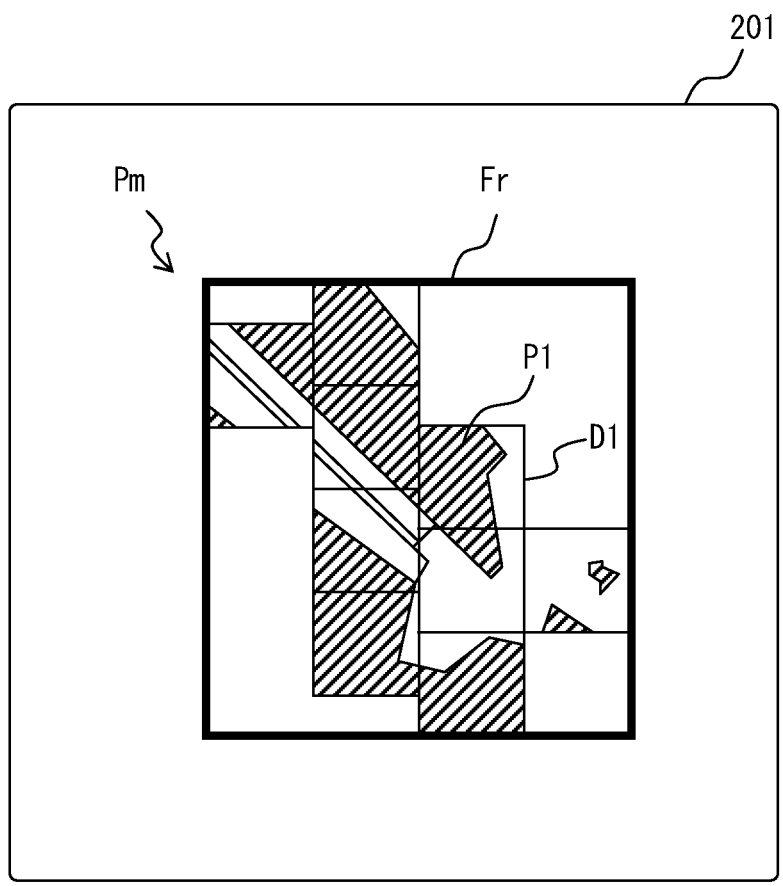
F I G. 5

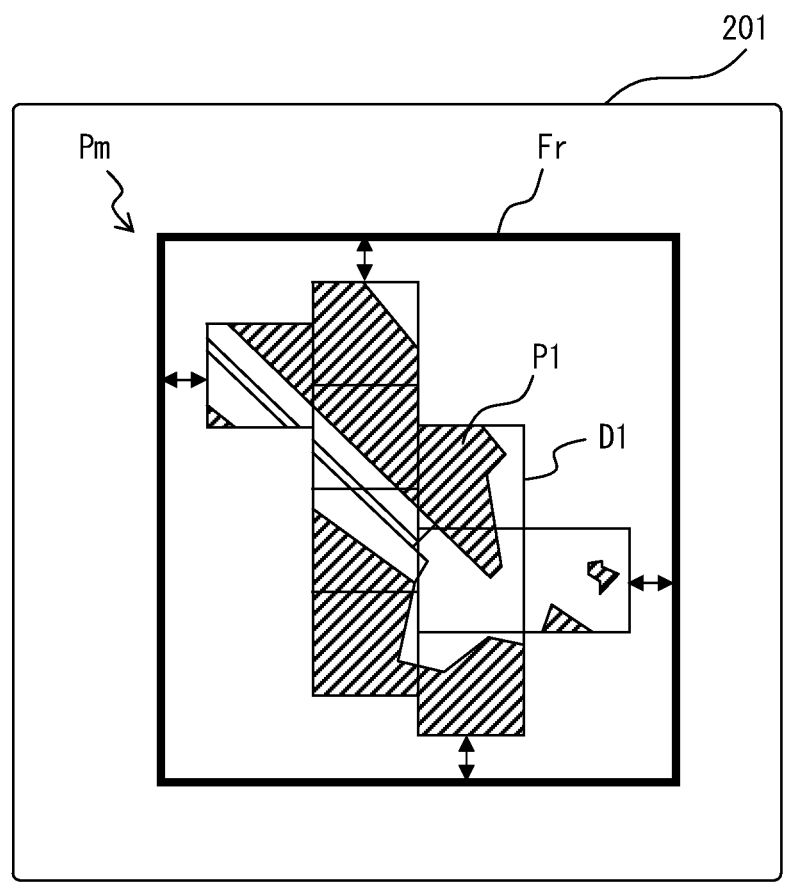
F I G. 6

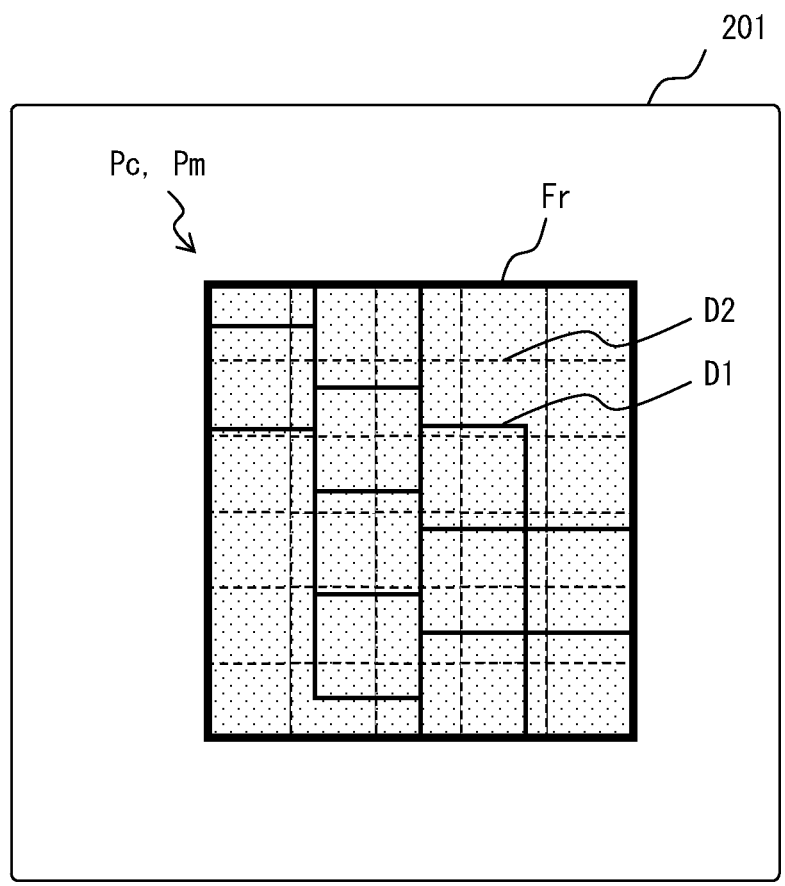
F I G. 7

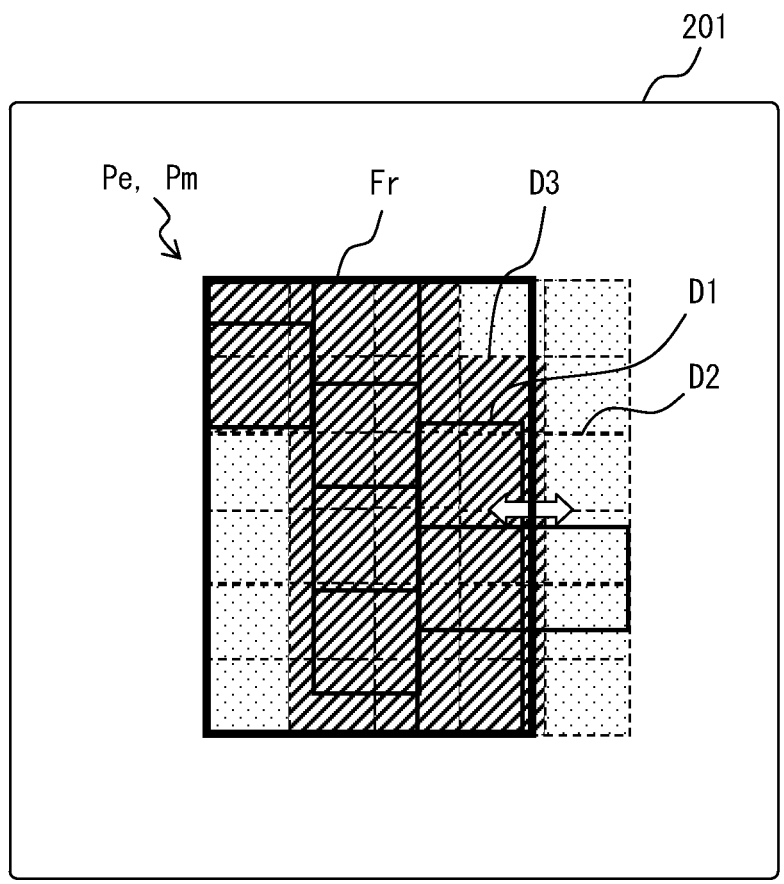
F I G. 1 2

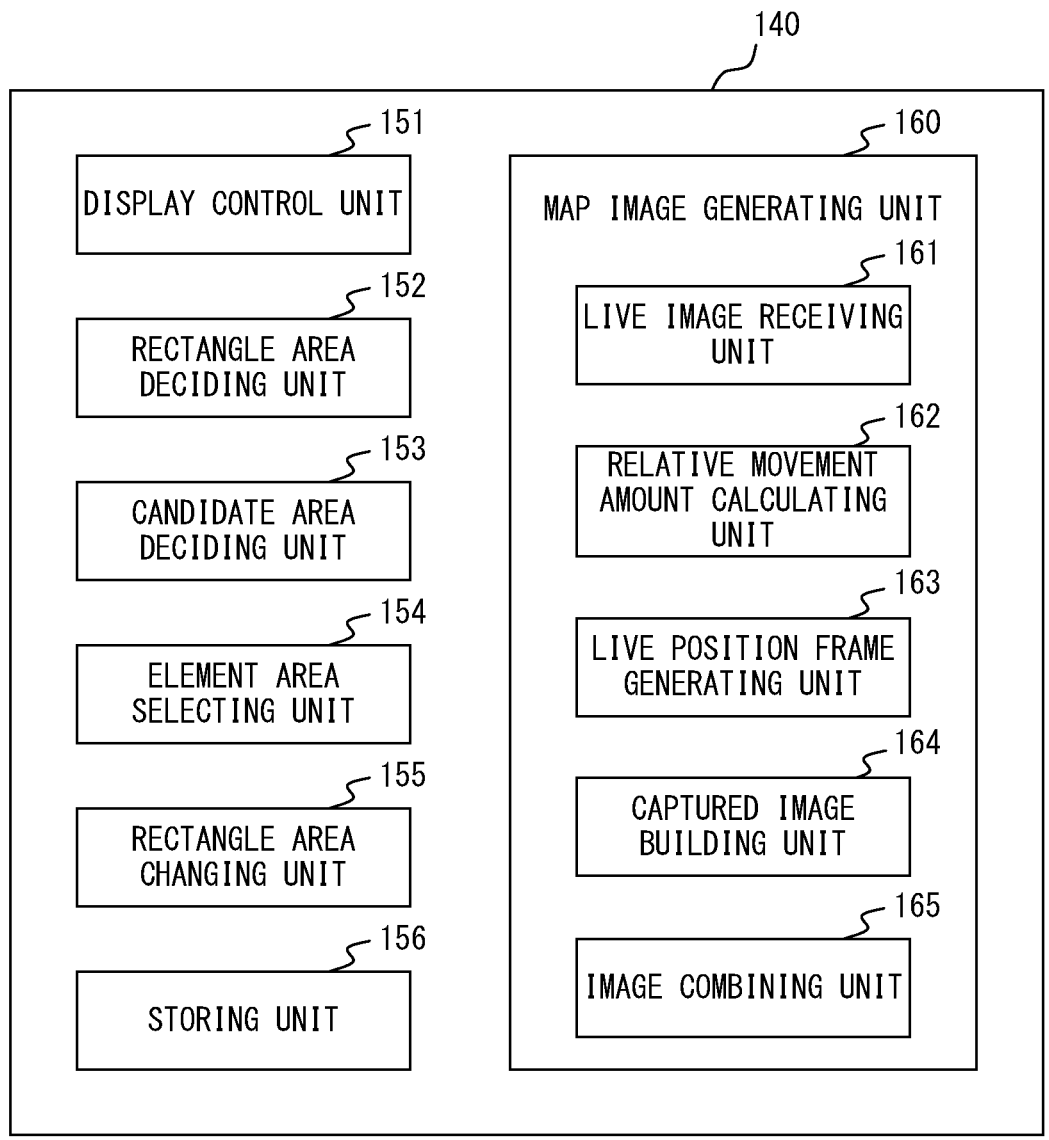
F I G. 1 4

MICROSCOPE SYSTEM AND METHOD FOR DECIDING STITCHED AREA

CROSS REFERENCE TO RELATED APPLICATIONS

This application is based upon and claims the benefit of priority from prior Japanese Patent Application No. 2013-102275, filed May 14, 2013, the entire contents of which are incorporated herein by this reference.

BACKGROUND OF THE INVENTION

Field of the Invention

The present invention relates to a microscope system that generates a stitched image in which a plurality of images are stitched, and a method for deciding the stitched area.

Description of the Related Art

In the field of the microscope, a technique to generate a wide-field image (hereinafter, described as a stitched image) that captures the image of a wider area than the field of view of the apparatus, by stitching a plurality of images that capture different areas of the sample.

In this technique, the higher the power of the objective lens that obtains the plurality of images (hereinafter, described as element images), the higher the resolution of the generated stitched image. Meanwhile, the higher the power of the objective lens, the narrower the field of view of the apparatus, increasing the number of the element images, and therefore the generation of the stitched image takes time.

A technique related to the technical challenge as described above is disclosed in, for example, Japanese Laid-open Patent Publication No. 2004-101871. The photographing apparatus for a microscope image disclosed in Japanese Laid-open Patent Publication No. 2004-101871 divides image information of a low-power field of view size obtained with a low-power objective lens into pieces image information of a high-power field of view size corresponding to the field of view size of a high-power objective lens, checks whether there is a sample image in the respective piece of image information of the high-power field of view size, and obtains high-definition image information by the high-power objective lens only for the high-power field of view size part that is found to have the sample image.

Therefore, by using the technique disclosed in Japanese Laid-open Patent Publication No. 2004-101871, the number of element images obtained by the high-power objective lens may be reduced.

SUMMARY OF THE INVENTION

An aspect of the present invention provides a microscope system for stitching element images to generate a stitched image, including an element image obtaining unit configured to obtain the element image to constitute the stitched image; a user image obtaining unit configured to capture a plurality of user-specified areas being an area of a sample specified by a user to obtain a plurality of user images; a rectangle area deciding unit configured to decide a rectangle area including the plurality of user-specified areas; a candidate area deciding unit configured to decide, as a candidate area being an area to be a candidate to obtain the element image, each of a plurality of areas having a size of a field of view of the element image obtaining unit arranged in a grid-like manner in the rectangle area so as to fill the rectangle area decided by the rectangle area deciding unit; and an element area selecting unit configured to select an element area to obtain the element image, from the plurality of candidate areas decided by the candidate area deciding unit.

Another aspect of the present invention provides a method for deciding a stitched area by a microscope system configured to generate a stitched image, including deciding, each of a plurality of areas having a size of a field of view of an element image obtaining unit of the microscope system arranged in a grid-like manner in a rectangle area, so as to fill the rectangle area including a plurality of user-specified areas specified by a user, as a candidate area being an area to be a candidate to obtain an element image that constitutes the stitched image; and selecting, from the plurality of candidate areas, an element area in which the element image obtaining unit obtains the element image, and deciding a stitched area comprising the element area.

BRIEF DESCRIPTION OF THE DRAWINGS

The present invention will be more apparent from the following detailed description when the accompanying drawings are referenced.

FIG. 3 is a flowchart illustrating the procedure of a stitched area deciding process executed in the microscope system illustrated in FIG. 1.

FIG. 5 is a diagram for explaining a rectangle area deciding process.

FIG. 6 is another diagram for explaining a rectangle area deciding process.

FIG. 7 is a diagram for explaining a candidate area deciding process.

FIG. 12 is yet another diagram for explaining the element area deciding process.

FIG. 14 is a functional block diagram of a control device illustrated in FIG. 1;

DESCRIPTION OF THE EMBODIMENTS

The photographing apparatus for a microscope image disclosed in Japanese Laid-open Patent Publication No. 2004-101871 segmentalizes the entire surface of the slide glass by the field of view size of the low-power objective lens, and obtains the image information of each segmented area by the low-power objective lens. That is, even for the area that is recognized by the user as unnecessary, the image information is equally obtained by the low-power objective lens, and whether or not it is necessary to obtain the high-resolution image information (element images) with the high-power objective lens is determined. For this reason, even though the number of element images obtained by the high-power objective lens is reduced, the generation time of the stitched image is not shortened sufficiently. Embodiments according to the present invention are described below.

Figure 1:
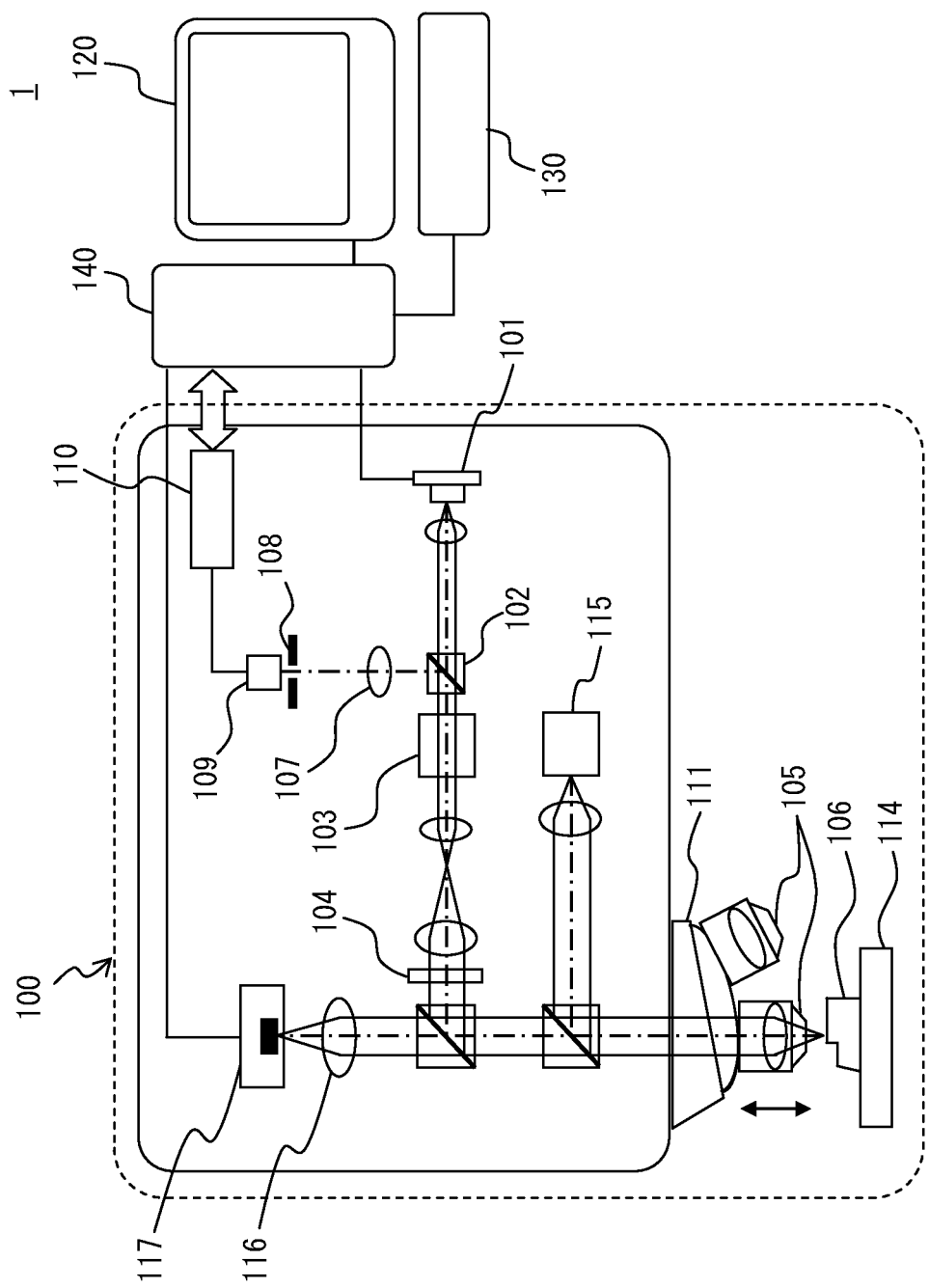
FIG. 1 is a diagram illustrating the configuration of the microscope system according to an embodiment of the present invention.

FIG. 1 is a diagram illustrating the configuration of a microscope system 1 according to an embodiment of the present invention. The microscope system 1 is a microscope system that obtains a plurality of confocal images capturing different areas of a sample, and generates a stitched image by stitching the confocal images according to the positional relationship of the captured areas.

The microscope system 1 includes, as illustrated in FIG. 1, a confocal microscope main body 100, a display device 120, an input device 130, and, a control device 140.

The confocal microscope main body 100 includes a laser light source 101, a polarization beam splitter (hereinafter, described as PBS) 102. a two-dimensional scanning unit 103 that scans a sample 106, a ¼λ plate 104, an objective lens 105 that illuminate the sample 106 with light, a tube lens 107, a pinhole plate 108, a photodetector 109, an AD converter 110, a revolver 111, an X-Y stage 114, a white light source 115, a tube lens 116, and, a CCD camera 117.

Meanwhile, the revolver 111 is a means to switch the objective lens 105, and is also a Z position changing means that changes the relative distance between the objective lens 105 and the sample 106. Meanwhile, the X-Y stage 114 is a XY position changing means that moves the sample 106 with respect to the object lens 105 in the direction orthogonal to the optical axis of the objective lens 105.

Laser light emitted from the laser light source 101 passes through the PBS 102 and after that, enters two-dimensional scanning unit 103. The two-dimensional scanning unit 103 is a Galvano mirror for example. The laser light deflected by the two-dimensional scanning unit 103 is converted from linear polarized light to circular polarized light, and after that, is cast on the sample 106 via the objective lens 105 attached to the revolver 111.

In the confocal microscope main body 100, the two-dimensional scanning unit 103 is placed on an optically conjugated position with the pupil position of the objective lens 105. For this reason, with the deflecting of the laser light by the two-dimensional scanning unit 103, the light collection position of the laser light moves in the XY direction on the focal plane of the objective lens 105, and accordingly, the sample 106 is scanned two-dimensionally by the laser light.

Here, the two-dimensional scanning by the two-dimensional scanning unit 103, the switching of the objective lens 105 placed on the optical path of the confocal microscope main body 100 by the rotation driving of the revolver 111, the driving of the revolver 111 to the optical axis direction (the Z direction) of the objective lens 105, and the driving of the X-Y stage 114 to the direction orthogonal to the optical axis of the objective lens 105 (the XY direction) are controlled by the control device 140. Meanwhile, as the method of the two-dimensional scanning by the two-dimensional scanning unit 103, the raster scan used generally in the confocal microscope is adopted.

The laser light reflected on the surface of the sample 106 (hereinafter, described as the reflected light) is converted from circular polarized light to linear polarized light by the ¼ λ plate 104 in which the laser light is incident via the objective lens 105, and after that, enters the PBS 102 via the two-dimensional scanning unit 103. At this time, the reflected light that enters the PBS 102 is reflected by the PBS 102 and guided to the tube lens 107, as it has a polarization plane that is orthogonal to the polarization plane of the laser light entering the PBS 102 from the laser light source 101 side.

The tube lens 107 collects the reflected light reflected by the PBS 102. In the pinhole place 108 provided on the reflection optical path from the PBS 102, a pinhole is formed on an optically conjugated position with the light collection position of the laser light formed on the focal plane of the objective lens 105. For this reason, when a certain part on the sample 106 surface is on the light collection position of the laser light by the objective lens 105, the reflected light from this part is collected on the pinhole and passes through the pinhole. Meanwhile, when a certain part on the sample 106 is out of the light collection position of the laser light by the objective lens 105, the reflected light from this part is not collected on the pinhole, and does not pass through the pinhole and is blocked by the pinhole plate 108.

The light that has passed through the pinhole is detected by the photodetector 109. The photodetector 109 is, for example, a photomultiplier tube (PMT). The photodetector 109 receives the light that has passed through this pinhole, that is, the reflected light only from the part positioned on the light collection position of the laser light by the objective lens 105 on the surface of the sample 106, and outputs the detection signal of the size according to the received light amount as a luminance signal representing the luminance of the part. The luminance signal being an analog signal goes through analog-digital conversion in the AD converter 110, and then is input to the control device 140 as luminance value information representing the luminance of the part. The control device 140 generates a confocal image of the sample based on the luminance value information and information of the scanning position in the two-dimensional scanning by the two-dimensional scanning unit 103.

That is, in the microscope system 1, the configuration from the laser light source 101 to the objective lens 105, the configuration of the objective lens 105 to the photodetector 109, the AD converter 110, and the control device 140 function as a means to obtain the confocal image.

Meanwhile, the confocal image is an element image that constitutes the stitched image in this embodiment. Therefore, hereinafter, the means to obtain the confocal image being the element image is described as an element image obtaining unit. In addition, the area on the sample 106 to obtain the element image is described as an element area, and the area on the sample 106 to obtain the stitched image composed of the element images is described as a stitched area. Therefore, the stitched area is composed of the element areas.

Meanwhile, light (white light) emitted from the while light source 115 is collected on the pupil position of the objective lens 105 attached to the revolver 111, and after that, is cast on the sample 106. Accordingly, the sample 106 is illuminated by Koehler illumination. The reflected light reflected on the sample 106 surface enters the tube lens 116, and the tube lens 116 collects the reflected light on the light-receiving plane of the CCD (coupling element) camera 117.

The CCD camera 117 is a camera having the light-receiving surface on an optically conjugated position with the focal plane of the objective lens 105. The image of the sample 106 is captured with the reflected light collected on the light-receiving plane, and a non-confocal image of the sample 106 is generated. The generated non-confocal image is sent to the control device 140.

That is, in the microscope system 1, the configuration from the white light source 115 to the objective lens 105, the configuration from the objective lens 105 to the CCD camera 117, and the control device 140 that controls the CCD camera 117 function as a means to obtain the non-confocal image.

Meanwhile, the non-confocal image is a user image obtained by capturing an area on the sample 106 specified by the user (hereinafter, the user-specified area) in this embodiment. Therefore, hereinafter, the means to obtain the non-confocal image being the user image is described as the user image obtaining unit. In addition, the image in which a plurality of user images are arranged according to the layout of the areas in which they are captured is described as a map image.

The display device 120 is, for example, a liquid crystal display device. The input device 130 is, for example, a mouse, a keyboard and the like. The display device 120 and the input device 130 may be configured in an integrated manner as a touch-panel display device.

Figure 2:
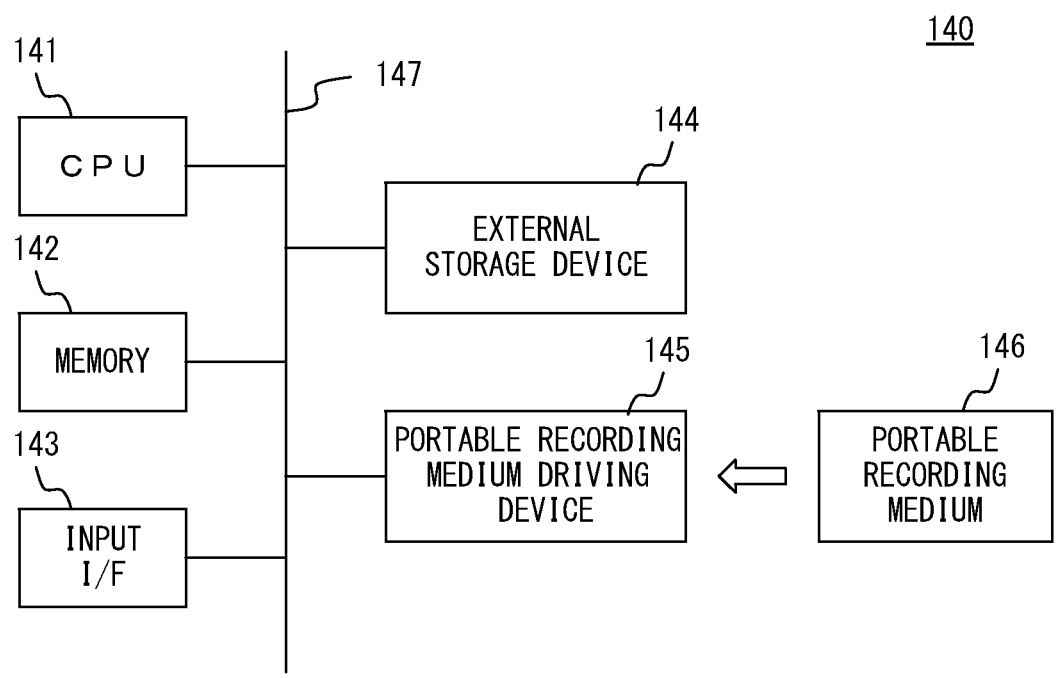
FIG. 2 is a diagram illustrating the hardware configuration of a control device illustrated in FIG. 1.

The control device 140 is a computer that executes a control program. As illustrated in FIG. 2, the control device 140 includes a CPU 141, a memory 142, an input/output I/F 143, an external storage device 144, a portable recording medium driving device 145 that accommodates the portable recording medium 146, and they are connected by a bus 147 so that various data may be given/received between the respective elements. Then, with the CPU 141 loading, onto the memory 142, and executing, a control program stored in the external storage device 144 or the portable recording medium 146, the operation of the microscope system 1 is controlled by the control device 140.

The memory 142 is, for example, a RAM (Random Access Memory). The input/output I/F 143 is, for example, an interface to give/receive data to/from a device outside the control device 140 such as the display device 120, the input device 130 an the like. The external storage device 144 stores the control program and information that is necessary for the execution of the control program in a non-volatile manner, and it is, for example, a hard disc device. The portable recording medium driving device 145 accommodates the portable recording medium 146 such as an optical disc and a compact flash (registered trademark), and in the same manner as the external storage device 144, the portable recording medium 146 stores the control program and information that is necessary for the execution of the control program in a non-volatile manner.

In the microscope system 1 configured as described above, a stitched area to obtain a stitched image is decided from an area of an indefinite shape specified by the user. Hereinafter, referring to FIG. 3 through FIG. 12, the procedure of the stitched area deciding process is explained.

Figure 4:
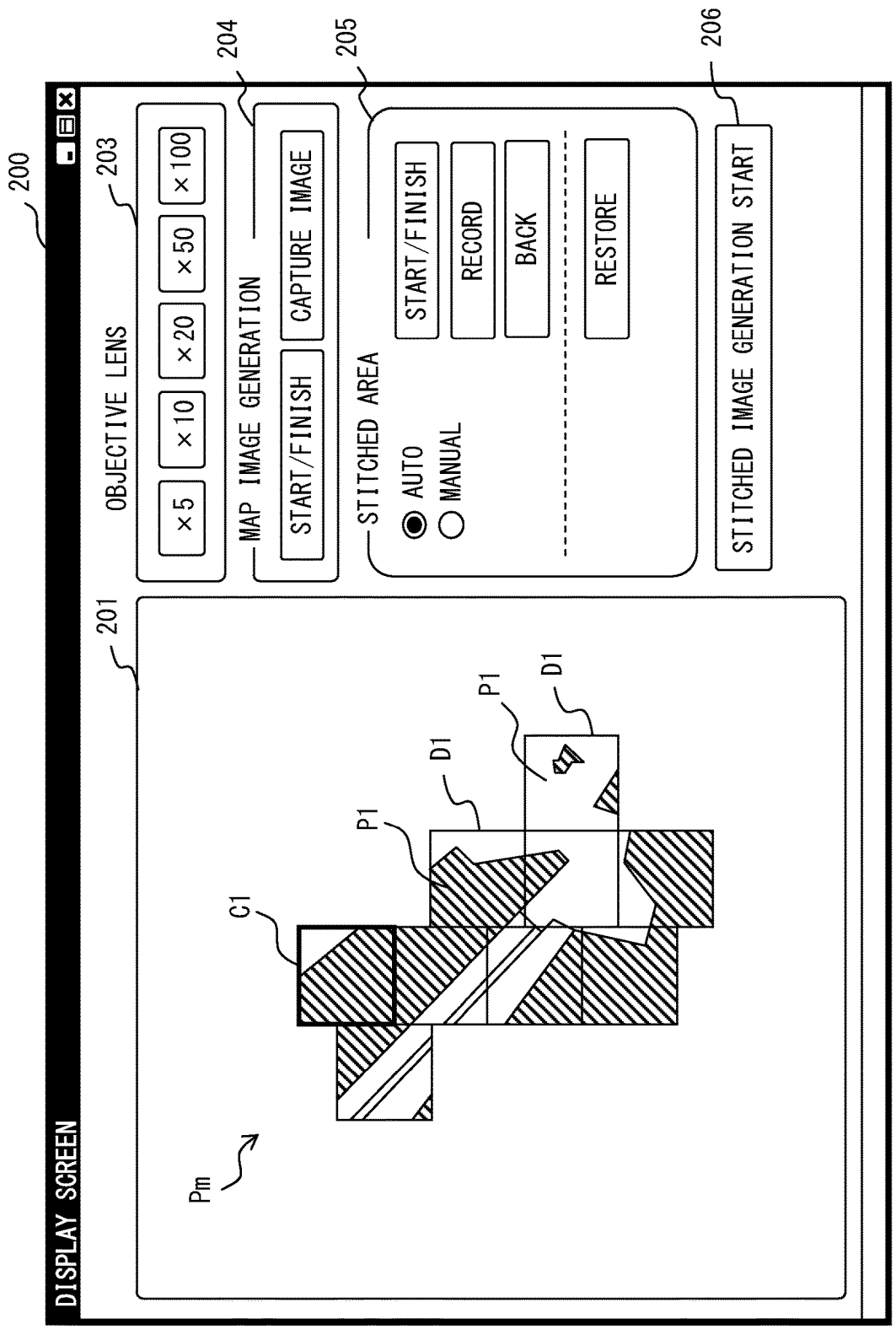
FIG. 4 is a diagram illustrating an example of a screen displayed on a display device illustrated in FIG. 1.
Figure 8:
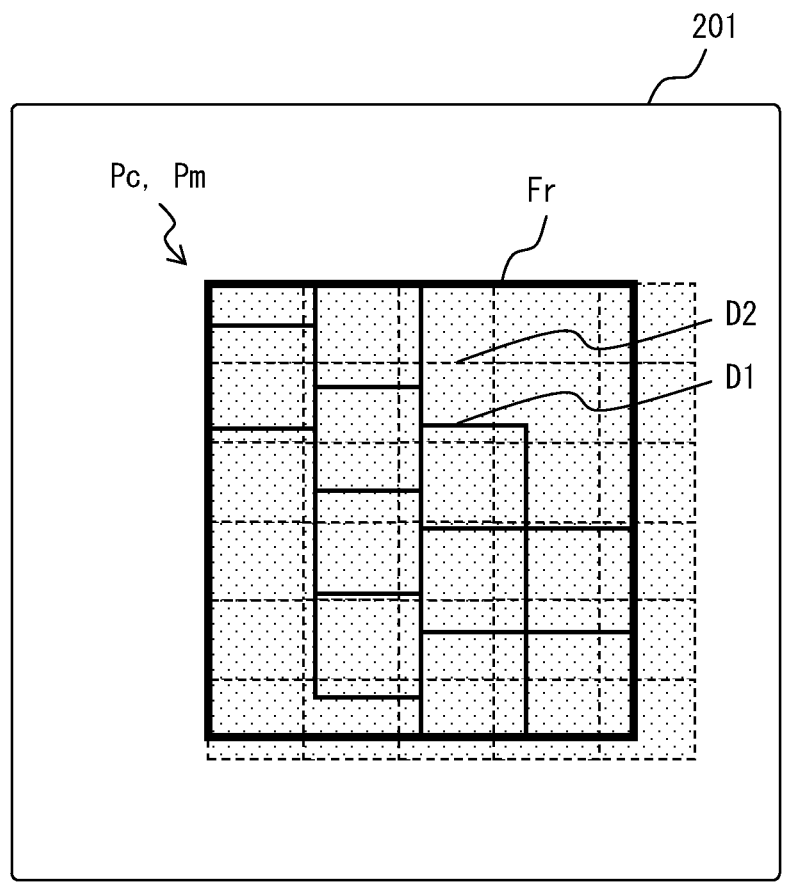
FIG. 8 is another diagram for explaining the candidate area deciding process.
Figure 9:
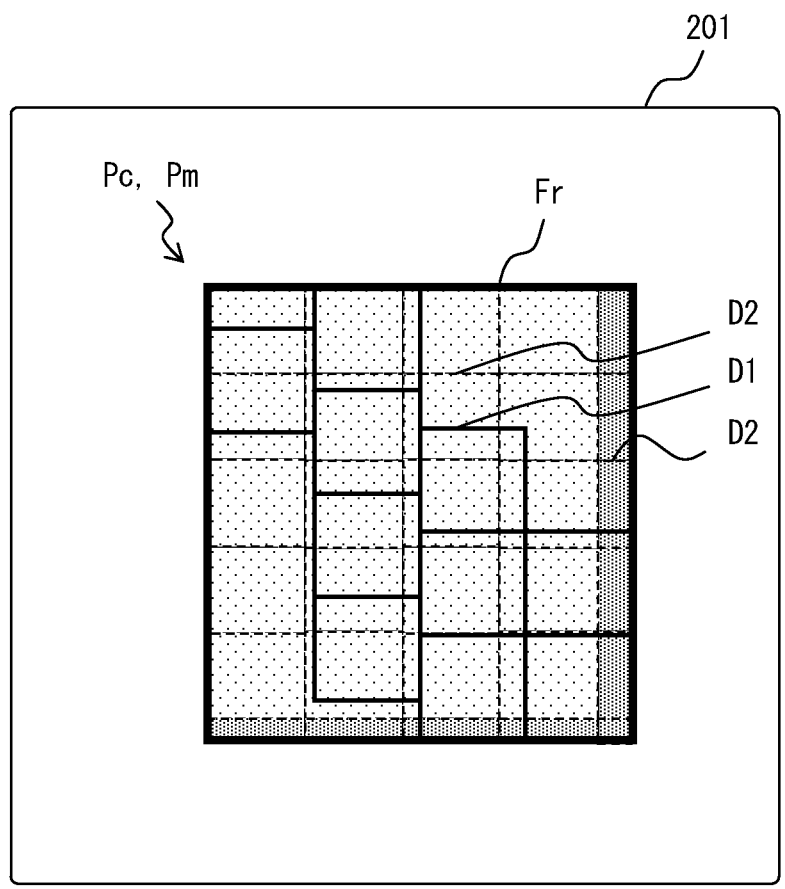
FIG. 9 is yet another diagram for explaining the candidate area deciding process.
Figure 10:
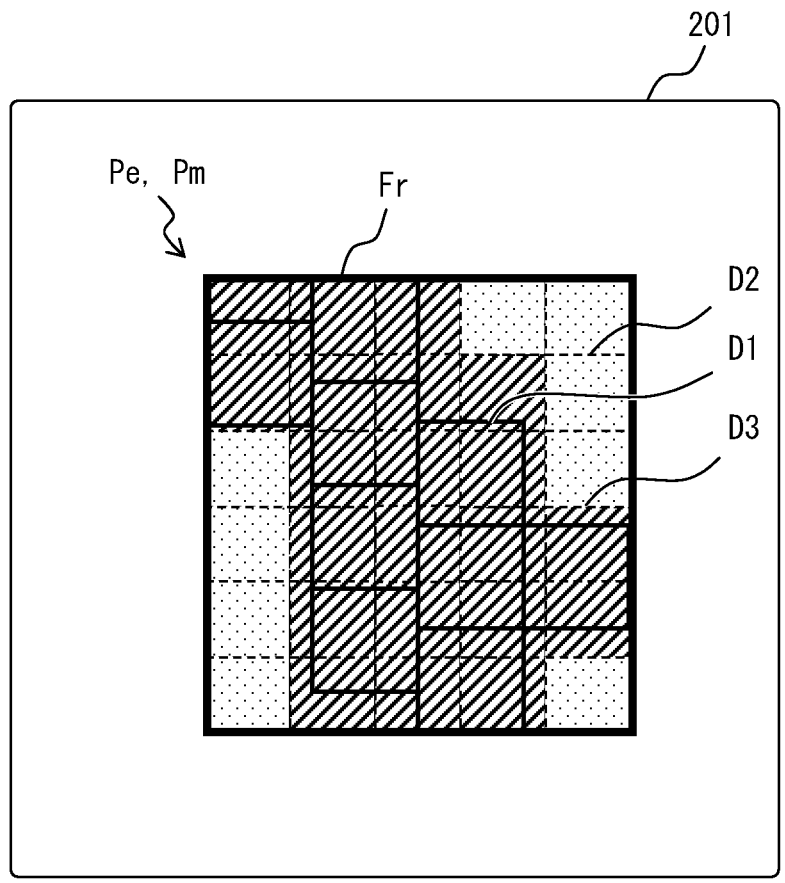
FIG. 10 is a diagram for explaining an element area deciding process.
Figure 11:
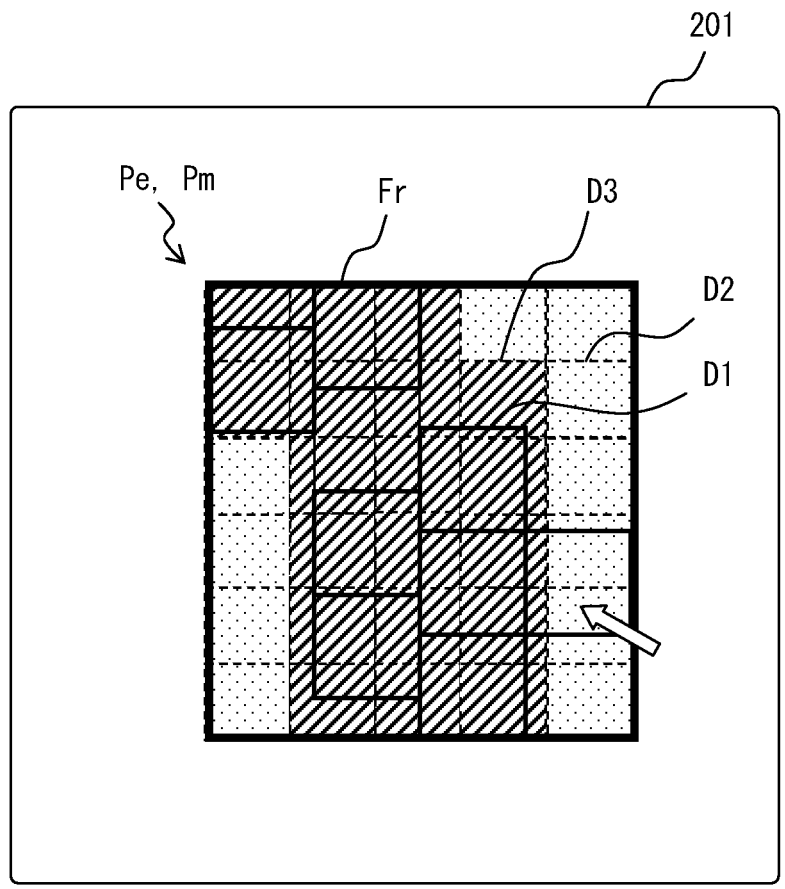
FIG. 11 is another diagram for explaining the element area deciding process.

FIG. 3 is a flowchart illustrating the procedure of the stitched area deciding process executed in the microscope system 1. FIG. 4 is a diagram illustrating an example of the screen displayed on the display device 120 in the stitched area deciding process. FIG. 5 and FIG. 6 are diagrams for illustrating the rectangle area deciding process in the stitched area deciding process. FIG. 7 through FIG. 9 are diagrams for explaining the candidate area deciding process in the stitched area deciding process. FIG. 10 through FIG. 12 are diagrams for explaining the element area deciding process in the stitched area deciding process.

The stitched area deciding process illustrated in FIG. 3 is executed with the CPU 141 deploying, on the memory 142, and executing, the control program stored in the external storage device 144 or the portable recording medium 146.

When the stitched area deciding process starts, the control device 140 makes a screen 200 illustrated in FIG. 4 displayed on the display device 120 (step S1 in FIG. 3, GUI screen display process). That is, the control device 140 is, in this embodiment, a display control unit that controls the display device 120.

Next, the control device 140 generates a map image according to the instruction from the user, and makes the display device 120 display the generated map image (step S2 in FIG. 3, map image generating process). That is, the control device 140 is a map image generating unit that generates the map image, in this embodiment.

In step S2, first, the user specifies the magnification of the objective lens by an operating unit 203 of a screen 200, and after that, presses the START/FINISH button of an operating unit 204, to order the start of the map image generating process. In reaction to this, the control device 140 makes a cursor C1 displayed on an image display unit 201 as illustrated in FIG. 4.

Meanwhile, the position of the cursor C1 corresponds to the coordinates of the X-Y stage 114 on which the sample 106 is placed. More specifically, for example, the position of the cursor C1 with respect to the entirety of the image display unit 201 indicates the current position of the field of view of the user image obtaining unit with respect to the entirety of the range of movement of the X-Y stage 114.

In addition, the size of the cursor C1 corresponds to the field of view size of the user image obtaining unit determined by the magnification of the objective lens 105 and the like. More specifically, for example, the ratio of the size of the cursor C1 to the entirety of the image display unit 201 indicates the ratio of the field of view size to the user image obtaining unit to the entirety of the range of movement of the X-Y stage 114.

In step S2, further, the user moves the X-Y stage 114 by moving the cursor C1, to set the field of the view of the user image obtaining unit on a given area of the sample 106 on placed on the X-Y stage 114. Then, with the user pressing the image obtaining button of the operating unit 204, the user image obtaining unit automatically captures the image of the area (user-specified area) on the sample 106, and obtaining the non-confocal image P1 (user image). Meanwhile, as a method of automatic image capturing, for example, a setting is made in advance so that the user image obtaining unit captures an image at prescribed time intervals. The obtained non-confocal image P1 is displayed on an area D1 (hereinafter, described as the area corresponding to the user-specified area) on the image display unit 201 corresponding to the area (user-specific area) on the sample 106 set by the user. This is repeated until the START/FINISH button of the operating unit 204 is pressed, a map image Pm in which a plurality of non-confocal images P1 obtained by the user image obtaining unit are arranged according to the layout of the plurality of user-specified area in which they were captured, as illustrated in FIG. 4, is displayed on the image display unit 201. After that, the user presses the START/FINISH button of the operating unit 204, to order the termination of the map image generating process. Meanwhile, a method (auto mode) in which the user image obtaining unit automatically captures the image of the area (user-specified area) set by the user on the sample 106 and obtains the non-confocal image P1 (user image) from when the START/FINISH button of the operating unit 204 is pressed until when the START/FINISH button of the operating unit 204 is pressed again is explained above, but the method may also be a method (manual mode) in which, after pressing the START/FINISH button of the operating unit 204, the field of view of the user image obtaining unit is set on a given area of the sample 106, and by the pressing of the CAPTURE IMAGE button of the operating unit 204 by the user, the image of the area (user-specific area) on the sample 106 is captured and the non-confocal image P1 (user image) is obtained. Meanwhile, details of the map image generating process are described later.

Next, the control device 140 decides a rectangle area including the plurality of user-specific areas specified by the user in step S2 (step S3 in FIG. 3, rectangle area deciding process). That is, in this example, the control device 140 is a rectangle area deciding unit that decides the rectangle area.

In step S3, first, the user specifies, by using the operating unit 203, the magnification of the objective lens used for capturing the confocal images (element images) that constitutes the stitched image. The user further selects the operation mode (the auto mode or the manual mode) by the radio button of an operating unit 205, and after that, presses the START/FINISH button of the operating unit 205, to order the start of the rectangle area deciding process. In response to this, the control device 140 decides a rectangle area on the sample 106 including the plurality of user-specified areas, and as illustrated in FIG. 5, displays, on the image display unit 201, a rectangle frame Fr indicating the area on the image display unit 201 corresponding to the decided rectangle area.

Meanwhile, FIG. 5 illustrates a case in which the rectangle area is decided as the minimum rectangle area including the plurality of user-specified areas, but in step S3, as illustrated in FIG. 6, a rectangle area that is larger than the minimum rectangle area may be decided as the rectangle area. In addition, when the stitched area deciding process starts, in advance, the magnification of the objective lens used for obtaining the confocal image (element image) may be specified and the operation mode (the auto mode or the manual mode) may be selected, and when the termination of the map image generating process is ordered by pressing the START/FINISH button of the operating unit 204 in step S2, a rectangle area on the sample 106 including the plurality of user-specified areas may be decided, and the rectangle frame Fr indicating the area on the image display unit 201 corresponding to the decided rectangle area may be displayed on the image display unit 201. In this case, step S3 may be omitted.

Next, the control device 140 decides an area (hereinafter, described as the candidate area) to be a candidate to obtain the confocal image (element image) that constitutes the stitched image, based on the rectangle area on the sample 106 decided by step S3 (step S4 in FIG. 3, candidate area deciding process). That is, in this embodiment, the control device 140 is a candidate area deciding unit that decides the candidate area.

In step S4, the control device 140 arranges in a grid-like manner, first, a plurality of areas each having the field of view size of the element image obtaining unit that obtains the confocal image, so as to fill the rectangle area on the sample 106. Then, each of the plurality of areas arranged in a grid-like manner is decided as a candidate area. The control device 140 controls, further, the display device 120 so that a position image Pc representing the positions of the plurality of candidate areas is overlaid and displayed on the map image Pm, as illustrated in FIG. 7. Since the position image Pc is a translucent image, the map image Pm may be visually recognized through the position image Pc.

In FIG. 7, each of areas D2 (hereinafter, described as areas corresponding to the candidate areas) on the image display unit 201 corresponding to the candidate area of the sample 106 is presented as a shaded area separated by broken lines. In FIG. 7, in order to simplify the illustration, the respective areas D2 corresponding to the candidate areas are arranged without overlapping with each other, but the areas D2 are actually arranged to overlap by a certain amount. This is because a relative positional relationship among confocal images (element images) is judged according to a pattern matching when generating the stitched image. Meanwhile, the following drawings also illustrate an example in which the candidate areas arranged without overlap in the same manner, these are also for simplifying the illustration, and actually, the arrangement is made with a certain amount of overlap. Meanwhile, the amount of overlap may be made settable between 1% and 50%, for example. In addition, in FIG. 7, in order to simplify the illustration, the illustration about the content of the non-confocal image P1 displayed on the area D1 corresponding to the user-specified area is omitted. In the following drawings, in the same manner, the illustration about the content of the non-confocal image P1 displayed on the area D1 corresponding to the user-specified area is omitted.

The field of view size of the element image obtaining unit is determined based on the magnification of the objective lens 105 and the scanning amount of the two-dimensional scanning unit 103 (that is, the zoom magnification). For this reason, for example, when a part of a plurality of areas having the field of view size of the element image obtaining unit sticks out of the rectangle area as illustrated in FIG. 8 with the zoom magnification of the two-dimensional scanning unit 103 being 1×, the control unit 140 may determine the scanning amount of the two-dimensional scanning unit 103 so that the plurality of areas fill the rectangle area without sticking out. In this case, as illustrated in FIG. 7, the scanning amount of all the candidate areas may be adjusted uniformly, or, as illustrated in FIG. 9, only the scanning amount of the two-dimensional scanning unit 103 in a part of the candidate areas may be adjusted. That is, the control device 140 may determine a plurality of different scanning amounts. In FIG. 9, areas corresponding to candidate areas with different scanning amounts are represented with shades of different depths.

Next, the control device 140 selects an element area to obtain the confocal image (element image) that constitutes the stitched image from the plurality of candidate areas decided in step S4 (step S5 in FIG. 3, element area deciding process). That is, in this embodiment, the control device 140 is an element area selecting unit that selects the element area.

When the operation mode of the stitched area deciding process is the auto mode, in step S5, the control device 140 selects, as a element area, a candidate area that includes an area overlapping with at least one of the plurality of user-specified area specified in step S2 from among the plurality of candidate areas decided in step S4. Here, the control device 140 makes the judgment, for example, according to whether or not luminance information is included in the respective candidate areas.

Furthermore, the control device 140 controls the display device 120 so that a position image Pe that indicates the positions of the plurality of the candidate areas and also indicates the positions of the plurality of element areas distinctively from the positions of the candidate areas that are not element areas is overlaid and displayed on the map image Pm. The position image Pe is a translucent image in which the part corresponding to the candidate area and the part corresponding to the element area have different degrees of transparency. Therefore, the map image Pm may be visually recognized through the position image Pe. In FIG. 10, each of areas D3 on the image display unit 201 (hereinafter, described as areas corresponding to the element areas) corresponding to the element area on the sample 106 is presented as a hatched area separated by broken lines.

After that, the user checks the image in which the position image Pe is overlaid and displayed on the map image Pm, and if needed, manually adjust the element area. This adjustment may be made with, for example, as illustrated in FIG. 11, the control device 140 excluding, from the element area, an area specified by a prescribed user operation (for example, a click operation). In addition, this adjustment may be made with, for example, as illustrated in FIG. 12, the control device 140 changing at least one of the size or the position of the rectangle area according to a prescribed user operation (for example, a drag operation) to the rectangle frame Fr. In this case, the control device 140 reselects, as element areas, the areas in the changed rectangle area from among the selected plurality of element areas. That is, in this embodiment, the control device 140 is a rectangle area changing unit that changes at least one of the size or the position of the rectangle area decided in step S3.

Meanwhile, the control device 140 makes coordinate information of the plurality of element areas that had been selected before the adjustment of the element areas stored temporarily in, for example, the memory 142 (storing unit). Therefore, with the user pressing the BACK button on the operating unit 205, the control device 140 is able to read out the coordinate information of the plurality of element areas stored in the memory 142 to restore the state before the adjustment.

On the other hand, when the operation mode of the stitched area deciding process is the manual mode, in step S5, the control device 140 selects the element area from the plurality of candidate areas decided in step S4, based on the selection by the user.

Meanwhile, the method of selection by the user may be, for example, a method such as to specify, from the plurality of candidate areas decided in step S4, the candidate area that is not to be the element area, and may also be a method such as to specify, from the plurality of candidate areas decided in step S4, the candidate area to be the element area.

Lastly, the control device 140, decides the stitched area based on the element area decided in step S5 (step S6 in FIG. 3), and terminates the stitched area deciding process.

In step S6, first, the user presses the START/FINISH button of the operating unit 205, to order the termination of the stitched area deciding process. In response to this, the control device 140 decides the area composed of the element areas decided in step S5 as the stitched area, and terminates the stitched area deciding process.

Then, after the stitched area is decided, with the user pressing a button 206, in the microscope system 1, the images of the plurality of element areas constituting the stitched area are captured sequentially by the element image obtaining unit to obtain the confocal images (element images), and a stitched image in which they are stitched is generated.

Meanwhile, the user may press the RECORD button of the operating unit 205 before ordering the termination of the stitched area deciding process. Accordingly, the control device 140 makes coordinate information of a plurality of element areas selected in step S5 stored in, for example, the external storage device 144 or the portable recording medium 146 (storing unit).

The coordinate information stored in the external storage device 144 or the portable recording medium 146 may be used, for example, in a case in which the observation is repeated while exchanging the sample with another sample of the same kind. Specifically, with the user pressing the RESTORE button of the operating unit 205 after the generation of a map image of the sample of the same kind, the control device 140 may decide the element areas from the stored coordinate information, and may overlay, and make the display device 120 display, a position image indicating the positions of the plurality of element areas on the map image.

Meanwhile, in a case such as when the position on the X-Y stage 114 on which the sample is placed is shifted before and after the exchange of the sample, it follows that the plurality of element areas are placed with a shift with respect to the sample, and the desired area of the sample may not be covered sufficiently by the plurality of element areas. In such as case, according to a prescribed user operation, the control device 140 may move the position image relatively with respect to the map image.

For example, when the user specifies a position outside the area corresponding to the plurality of element areas in the position image by a prescribed operation (for example, a double click), the control device 140 may move the position image relatively with respect to the map image, so that the specified position corresponds to the center of the position image. In addition, when the user specifies a position inside the area corresponding to the plurality of element areas in the position image by a prescribed operation (for example, a double click), the control device 140 may move the position image relatively with respect to the map image, so that the specified position corresponds to the center of the element area including the specified position.

Meanwhile, an example of overlaying the position image over the map image is illustrated, but instead of the map image, the position image may be overlaid on a piece of image obtained by a low-power objective lens.

Here, a supplement is provided to the operation of the control device 140 in the map image generating process. FIG. 14 is a functional block diagram of the control device 140. The control device 140 includes an image generating unit 160, in addition to the display control unit 151, the rectangle area deciding unit 152, the candidate area deciding unit 153, the element area selecting unit 154, the rectangle area changing unit 155, and the storing unit 156 described above.

The map image generating unit 160 includes a live image receiving unit 161, a relative movement amount calculating unit 162, a live position frame generating unit 163, a captured image building unit 164, and, an image combining unit 165.

The live image receiving unit 161 receives the live image transmitted as needed from the CCD camera 117, and makes the storing unit 156 store the received live image, and also transmits it to the relative movement amount calculating unit 162 and the captured image building unit 164

The relative movement amount calculating unit 162 receives the live image transmitted from the live image receiving unit 161, compares it with the last-received live image and calculates the relative movement amount of the field of view with respect to the X-Y stage 114. Then, the calculated relative movement amount is transmitted to the live position frame generating unit 163 and the image combining unit 165.

The live position frame generating unit 163 receives the relative movement amount transmitted from the relative movement amount calculating unit 162, adds it to the total of the relative movement amounts that have already been received to calculate the current position of the field of view, and transmits the position information to the display control unit 151 as the position information of the live position frame. In response to this, the display control unit 151 display the cursor C1 being the live position frame on the position indicating the current position of the field of view of the user image obtaining unit, as illustrated in FIG. 4.

The captured image building unit 164 receives the live image transmitted from the live image receiving unit 161 as needed. Then various image processes are applied to the live image received at the timing when the CAPTURE IMAGE button of the operating unit 204 illustrated in FIG. 4 to generate a user image, and the generated user image is transmitted to the image combining unit 165. The image process performed in the captured image building unit 164 is, for example, an optical black subtraction process, a white balance adjusting process, a synchronization process, a color matrix operation process, a gamma correction process, a color reproduction process, and the like.

The image combining unit 165 receives the relative movement amount transmitted from the captured image building unit 164, adds it to the total of the relative movement amounts that have already been received to calculate the current position of the field of view. Furthermore, the user image transmitted from the captured image building unit 164 is received, and combined in the position corresponding to the calculated current field of view position. Accordingly, a map image in which a plurality of user images are arranged according to the layout of the areas in which these were captured (that is, the field of view positions) is generated. The image combining unit 165 transmits the generated map image to the display control unit 151. In response, the display control unit 151 displays the map image Pm on the image display unit 201.

As described above, in the microscope system 1, since the stitched area is decided from an area of an indefinite shape specified by the user, there is no need to capture the image of the entirety of the sample in advance to decide the stitched area. For this reason, it becomes possible to shorten the time required for deciding the stitched area. In addition, in the microscope system 1, since the stitched area is decided so that the unnecessary area for which the user does not desire imaging becomes small in stitched area, the image capturing of the unnecessary area for which the user does not desire imaging is suppressed. For this reason, the time required for obtaining the element image that constitutes the stitched image may be shortened. Therefore, according to the microscope system 1, it becomes possible to make the time required for generating the stitched image significantly shorter than ever.

Meanwhile, the microscope system 1 may generate a three-dimensional stitched image in which three-dimensional images are stitched. In this case, the generation time of the stitched image tends to be longer as there is a need to obtain a plurality of confocal images with different Z positions for the respective element areas to generate the three-dimensional image, but by deciding the stitched area using the method for deciding the stitched area described above, the time for generating the stitched image may be shortened significantly.

The embodiment described above illustrates a specific example to facilitate the understanding of the invention, and the present invention is not limited to this embodiment. Various modifications, changes may be made to the microscope system, the method for deciding the stitched area, and the program, without departing from the spirit of the present invention defined by the claims.

Figure 13:
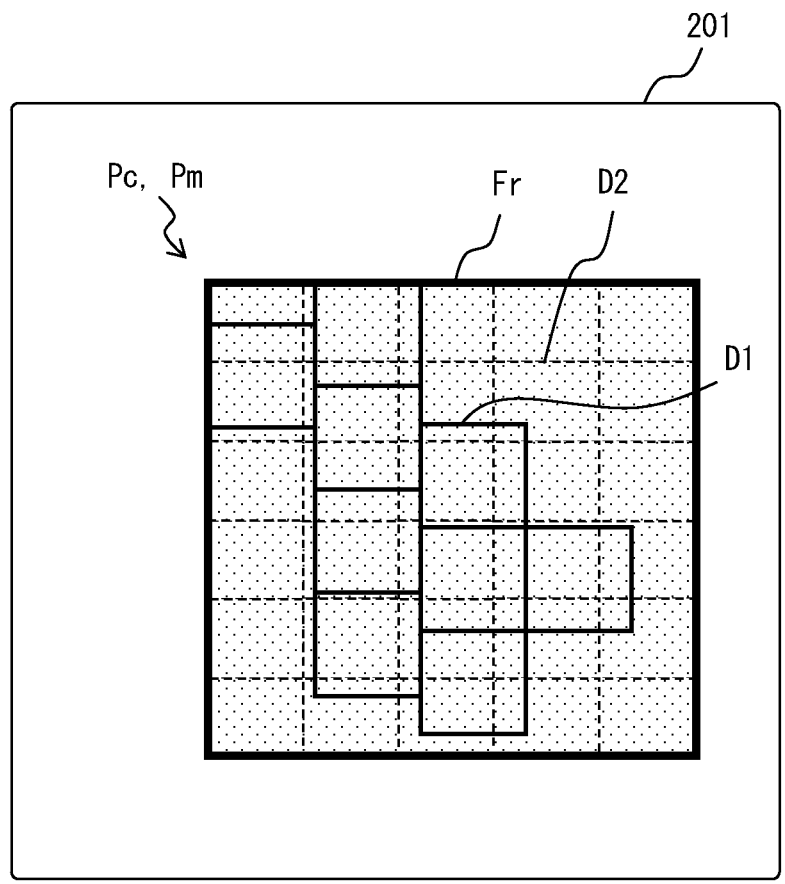
FIG. 13 is a diagram illustrating another example of a deciding method of the rectangle area and the candidate area.

For example, in FIG. 3, an example in which the control device decides the plurality of candidate areas after deciding the rectangle area is illustrated, but as long as the rectangle area includes a plurality of user-specified areas and is filled with a plurality of candidate areas as well, the rectangle area may be decided after the plurality of candidate areas are decided. FIG. 13 is an example of the image displayed on the image display unit 201 when the rectangle area is decided after deciding the plurality of candidate areas. In addition, when switching of the objective lens occurs after the START/FINISH button of the operating unit 205 is pressed, the processes after step S3 in FIG. 3 may be performed again, to re-determine the element area again.

In addition, in FIG. 1, an example in which the user image obtaining unit includes a non-confocal optical system and the element image obtaining unit includes a confocal optical system, but there may be constituted by the same optical system except the objective lens 105. For example, the user image obtaining unit may be a non-confocal optical system including a 5× objective lens, and the element image obtaining unit may be a non-confocal optical system including a 50× objective lens. The user image obtaining unit may be a confocal optical system including a 5× objective lens, and the element image obtaining unit may be a confocal optical system including a 50× objective lens. That is, the user image is not limited to the non-confocal image, and the element image is not limited to the confocal image.

What is claimed is:

1. A microscope system for stitching a plurality of element images to generate a stitched image, the system comprising:
   at least one optical system via which a sample can be imaged; and
   a computer which is configured to function as:
      an element image obtaining unit configured to obtain, via the at least one optical system, each of the plurality of element images that constitutes the stitched image;
      a user image obtaining unit configured to move, according to an instruction from a user, a field of view of the user image obtaining unit to a plurality of positions on the sample corresponding, respectively, to a plurality of user-specified areas on the sample which are specified by the user, each user-specified area corresponding to a current field of view of the user image obtaining unit, and capture, via the at least one optical system, a plurality of user images of the respective user-specified areas on the sample;
      a rectangle area deciding unit configured to decide a minimum rectangle area comprising all of the plurality of user images of the plurality of user-specified areas obtained by the user image obtaining unit;
      a candidate area deciding unit configured to decide a plurality of candidate areas for obtaining respective ones of the plurality of element images, each of the plurality of candidate areas having a size of a field of view of the element image obtaining unit and being arranged in a grid-like manner in the rectangle area so as to fill the rectangle area decided by the rectangle area deciding unit;
      an element area selecting unit configured to select a plurality of element areas for respectively obtaining the plurality of element images, from among the plurality of candidate areas decided by the candidate area deciding unit, wherein the element image obtaining unit obtains, via the at least one optical system, the plurality of element images in the plurality of element areas selected by the element area selecting unit, and a stitched image generation unit configured to generate the stitched image by stitching the plurality of element images obtained by the element image obtaining unit, wherein:

the at least one optical system comprises a first optical system and a second optical system;

the first optical system includes a laser light source, a two-dimensional scanning unit configured to scan the sample by laser light emitted from the laser light source, a pinhole plate in which a pinhole is formed on an optically conjugated position with a light-collecting point of the laser light, and a photodetector configured to detect light that has passed through the pinhole plate;

the element image obtaining unit obtains the plurality of element images via the first optical system, the element images being confocal images of the sample each generated from a detection signal output from the photodetector and information of a scanning position from the two-dimensional scanning unit;

the second optical system comprises a light source, an objective lens configured to cast light from the light source on the sample, and a CCD camera comprising a light-receiving plane on an optically conjugated position with a focal plane of the objective lens; and the user image obtaining unit obtains the plurality of user images via the second optical system, the user images being non-confocal images of the sample generated by the CCD camera.

2. The microscope system according to claim 1, wherein the element area selecting unit selects, as the plurality of element areas, a plurality of the candidate areas which each comprise an area overlapping with at least one of the plurality of user images of the plurality of user-specified areas, from among the plurality of candidate areas decided by the candidate area deciding unit.

3. The microscope system according to claim 1, wherein the element area selecting unit selects, based on a selection by the user, the plurality of element areas from among the plurality of candidate areas decided by the candidate area deciding unit.

4. The microscope system according to claim 1, wherein:

the size of the field of view of the element image obtaining unit is decided based on a scanning amount of the two-dimensional scanning unit.

5. The microscope system according to claim 4, wherein the candidate area deciding unit decides the scanning amount of the two-dimensional scanning unit so that the plurality of candidate areas arranged in a grid-like manner in the rectangle area fill the rectangle area without sticking out of the rectangle area.

6. The microscope system according to claim 5, wherein the candidate area deciding unit decides a plurality of different scanning amounts of the two-dimensional scanning unit so that the plurality of candidate areas arranged in a grid-like manner in the rectangle area fill the rectangle area without sticking out of the rectangle area.

7. The microscope system according to claim 1, further comprising:

a display;

wherein:

the computer is further configured to function as a display control unit configured to control the display, and the display control unit controls the display so that, on a map image in which the plurality of user images obtained by the user image obtaining unit are arranged according to a layout of the plurality of user-specified areas, a position image indicating positions of the plurality of candidate areas decided by the candidate area deciding unit is overlaid and displayed.

8. The microscope system according to claim 7, wherein the position image overlaid on the map image is a translucent image.

9. The microscope system according to claim 1, further comprising:

a display;

wherein:

the computer is further configured to function as a display control unit configured to control the display, and the display control unit controls the display so that, on a map image in which the plurality of user images obtained by the user image obtaining unit are arranged according to a layout of the plurality of user-specified areas, a position image indicating positions of the plurality of element areas selected by the element area selecting unit is overlaid and displayed.

10. The microscope system according to claim 1, further comprising:

a display;

wherein:

the computer is further configured to function as a display control unit configured to control the display, and the display control unit controls the display so that, on a map image in which the plurality of user images obtained by the user image obtaining unit are arranged according to a layout of the plurality of user-specified areas, a position image indicating positions of the plurality of candidate areas decided by the candidate area deciding unit and indicating positions of the plurality of element areas selected by the element area selecting unit distinctly from a position of a candidate area that is not an element area is overlaid and displayed.

11. The microscope system according to claim 10, wherein the position image overlaid on the map image is a translucent image in which a part corresponding to the candidate area and a part corresponding to the element area have different degrees of transparency.

12. The microscope system according to claim 1, further comprising a memory configured to store coordinate information of the plurality of element areas selected by the element area selecting unit.

13. The microscope system according to claim 12, further comprising:

a display;

wherein:

the computer is further configured to function as a display control unit configured to control the display, and the display control unit makes the display a position image indicating positions of the plurality of element areas overlaid on a sample image being an image of the sample, based on the coordinate information of the plurality of element areas stored in the memory.

14. The microscope system according to claim 13, wherein when a position specified by the user is outside an area corresponding to the plurality of element areas in the position image, the display control unit moves the position image with respect to the sample image so that the specified position corresponds to a center of the position image.

15. The microscope system according to claim 13, wherein when a position specified by the user is inside an area corresponding to the plurality of element areas in the position image, the display control unit moves the position image with respect to the sample image so that the specified position corresponds to a center of the element area comprising the specified position.

16. The microscope system according to claim 1, wherein:
the computer is further configured to function as a rectangle area changing unit configured to change at least one of a size or a position of the rectangle area decided by the rectangle area deciding unit, and
the element area selecting unit re-selects, as an element area, an area in the rectangle area changed by the rectangle area changing unit from the plurality of element areas selected in the element area selecting unit.

17. The microscope system according to claim 16, further comprising a memory configured to store coordinate information of a plurality of element areas selected by the element area selecting unit before the rectangle area is changed by the rectangle area changing unit.

* * * * *